United States Patent [19]

Miyazono

[11] Patent Number: 5,333,278
[45] Date of Patent: Jul. 26, 1994

[54] MULTIPROCESSOR SYSTEM WITH PROGRAM CHANGE FUNCTION CONTROLLED BY ONE PROCESSOR

[75] Inventor: Takashi Miyazono, Tokyo, Japan

[73] Assignee: NEC Corporation, Tokyo, Japan

[21] Appl. No.: 935,198

[22] Filed: Aug. 26, 1992

[30] Foreign Application Priority Data

Aug. 26, 1991 [JP] Japan .................. 3-236904

[51] Int. Cl.⁵ .............................................. G06F 13/00
[52] U.S. Cl. ............................. 395/325; 364/DIG. 1; 364/254.4; 364/228.1; 364/229; 364/243.1; 364/254.8; 395/425
[58] Field of Search ............... 395/650, 425, 200, 325

[56] References Cited

U.S. PATENT DOCUMENTS

| | | | |
|---|---|---|---|
| 4,181,940 | 1/1980 | Underwood et al. | 395/575 |
| 4,539,656 | 9/1985 | Abrant | 364/DIG. 1 |
| 4,713,759 | 12/1987 | Yamagishi et al. | 364/DIG. 1 |
| 4,949,298 | 8/1990 | Nakanishi et al. | 364/DIG. 2 |
| 4,959,776 | 9/1990 | Deerfield et al. | 364/DIG. 1 |
| 5,146,581 | 9/1992 | Kaneko | 395/425 |
| 5,167,028 | 11/1992 | Shives | 395/425 |

Primary Examiner—Eddie P. Chan
Attorney, Agent, or Firm—Foley & Lardner

[57] ABSTRACT

In a multiprocessor system with program change function according to the present invention, a special CPU among a plurality of CPU's inputs program data from outside and outputs the control signal to cancel the control over the storage means of another CPU during program data input, and outputs the switching signal to specify the storage means to store the program data among a plurality of storage means. Then, switching signal from the special CPU causes the decoder as the selection means to select one of the plurality of storage means and the special CPU serially executes program data storing to the selected storage means, which results in change of the program data in each storage means.

7 Claims, 4 Drawing Sheets

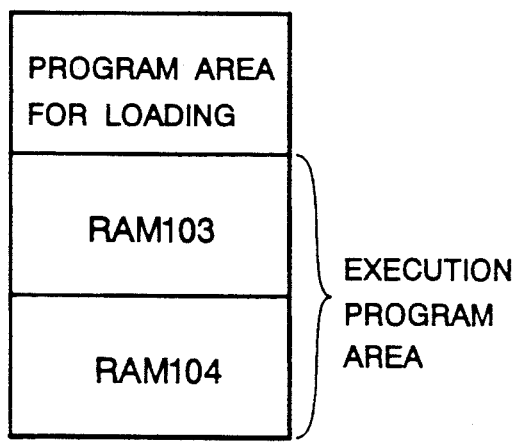
FIG.2A
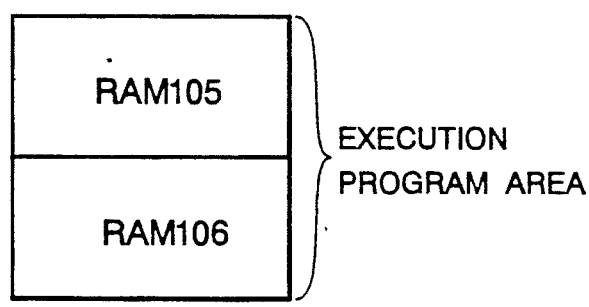
FIG.2B
FIG.3
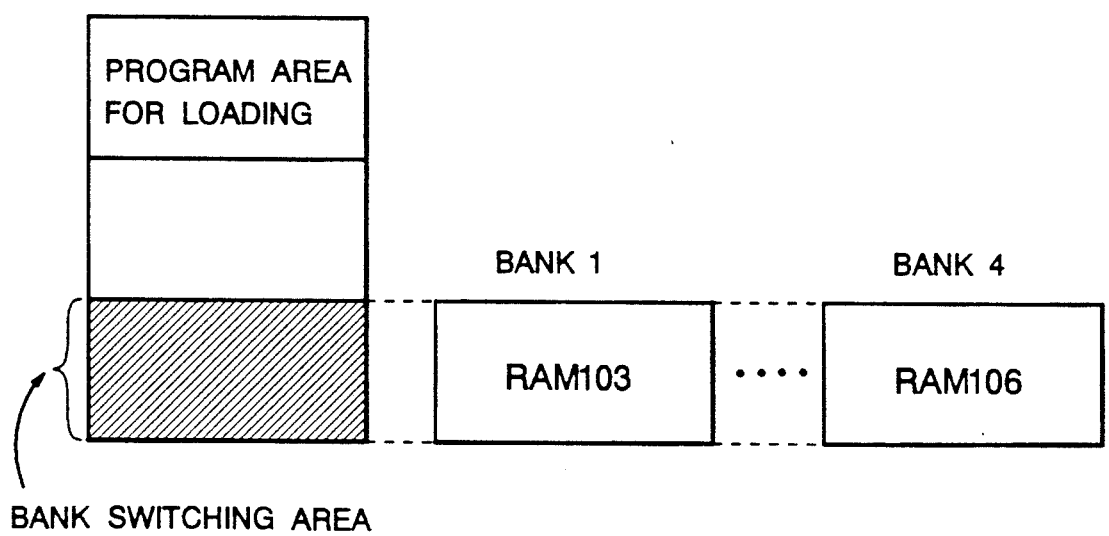

CPU1 ADDRESS MAP

CPU2 ADDRESS MAP

CPU1 ADDRESS MAP

MULTIPROCESSOR SYSTEM WITH PROGRAM CHANGE FUNCTION CONTROLLED BY ONE PROCESSOR

BACKGROUNDS OF THE INVENTION

1. Field of the Invention

This invention relates to a method and apparatus to change the program to be executed by a CPU in a multiprocessor system comprising a plurality of CPU's.

2. Description of the Prior Art

Conventionally, a multiprocessor system comprising a plurality of CPU's in its package is provided with a RAM or other storage means to store the program data to be executed for each CPU. To change program data in such a multiprocessor system, program data must be down loaded from outside to the plurality of CPU's. For this reason, a multiprocessor system having the first and the second CPU is provided with a storage means for data exchange between the two CPU's such as a dual port memory.

To change the program data, the first CPU receives the program data given from outside and changes the program data in its own RAM and at the same time uses the dual port memory RAM to pass the program data from outside to the second CPU. Then, the second CPU reads out the program data stored in the dual port memory RAM, and stores this program data to its own RAM in order to change the program.

However, in this conventional method for program change in a multiprocessor system, the first CPU is required to have not only a means to receive the program data from outside and change its own program, but also another means to pass the data to the second CPU. Further, the second CPU also requires a means to receive data from the first CPU. The need of several means to pass the program data from outside to each CPU and communication among them results in complicated processing for program change. Besides, a special storage means such as a dual port memory RAM is required for program data exchange among a plurality of CPU's.

SUMMARY OF THE INVENTION

An object of the present invention is to provide a multiprocessor system with program change function which enables easy program data change without complicated program data communication.

Another object of the present invention is to provide a multiprocessor system provided with a program change function which does not require any special storage means for program data change such as a dual port memory.

According to a preferred embodiment of the present invention to attain this object, a multiprocessor system with program change function comprises a plurality of CPU's, a plurality of storage means to store program data to be executed by the CPU's provided at each of the CPU's, a particular one of which further comprises an input means to input program data from outside, an output means to output control signal to cancel control over the storage means of the other CPU's during program data input, and another output means to output switching signal to specify one of the storage means to store the program data from the plurality of storage means, a selection means to select one of the plurality of storage means according to the switching signal from the particular CPU, and a means to connect or disconnect the control signal for the storage means selected by the particular CPU according to the control signal for the program data input.

According to another preferred embodiment, the selection means comprises a decoder to decode the switching signal from the particular CPU and selectively output the selection signal for the plurality of storage means, and the connection and disconnection means comprises a buffer which intervenes between the particular CPU and the storage means and controls output according to the control signal from the CPU.

According to further preferred embodiment, the connection and disconnection means comprises a buffer which intervenes between the particular CPU and the storage means and controls output according to the control signal from the CPU.

According to still another preferred embodiment, the particular CPU assigns the selected storage means to the address area of its own storage means.

According to further preferred embodiment, a multiprocessor system further comprises a transfer means for data communications between the particular CPU and the other CPU storage means, and the transfer means comprises a bidirectional buffer provided between the particular CPU and the other CPU storage means.

According to another preferred embodiment, a multiprocessor system with program change function to attain this object comprises a plurality of CPU's, a plurality of storage means to store program data to be executed by the CPU's provided at each of the CPU's, a particular one of which further comprises an input means to input program data from outside, an output means to output the control signal to cancel control over the other CPU storage means during program data input, and another output means to output switching signal to specify one of the storage means to store the program data from the other CPU storage means, a selection means to select one of the plurality of storage means according to the switching signal from the particular CPU, and a means to connect or disconnect the control signal for the storage means selected by the particular CPU according to the control signal for the program data input.

According to still another preferred embodiment, the address area of the particular CPU is provided with an address area for assigning the storage means of other CPU selected by the selection means in addition to the address area of the storage means for the particular CPU itself.

Other objects, characteristics and effects of the present invention will be clarified in the detailed description below.

BRIEF DESCRIPTION OF THE DRAWINGS

FIG. 2, comprising FIG. 2A and FIG. 2B, is a diagram to show the address maps of the multiprocessor system according to the first embodiment in normal status;

FIG. 3 is a diagram to show the address map of the multiprocessor system according to the first embodiment when program data is input;

FIG. 5, comprising

DESCRIPTION OF THE PREFERRED EMBODIMENT

Figure 1:
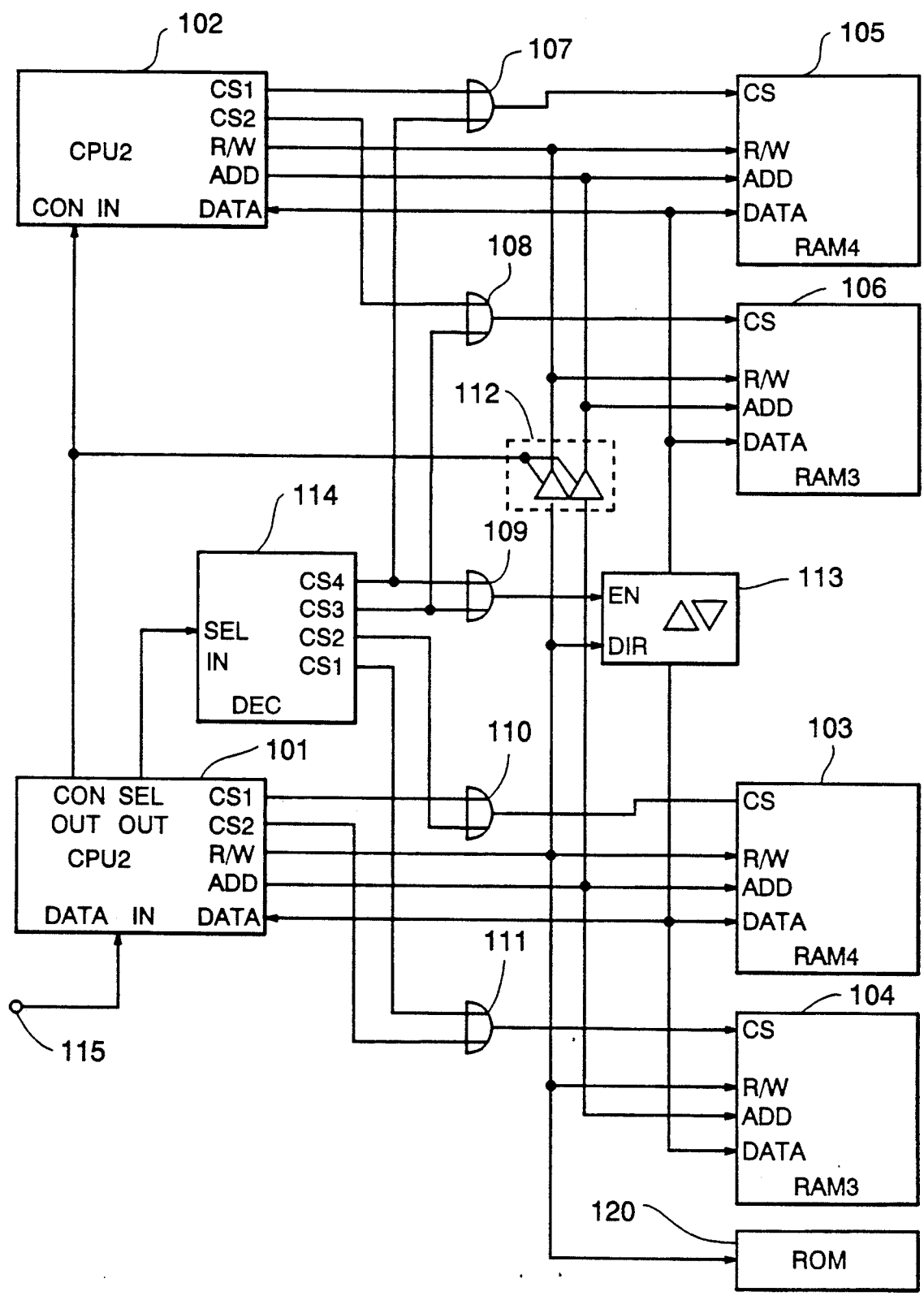
FIG. 1 is a block diagram to show the configuration of a multiprocessor system having program change function according to a first embodiment of the present invention.

Referring to the attached figures, a multiprocessor system with program change function according to a first embodiment of the present invention will be described below. FIG. 1 is a block diagram to show the configuration of a multiprocessor system which adopts the program change method according to a first embodiment of the present invention. This multiprocessor system comprises two CPU's 101 and 102, four RAM's 103, 104, 105 and 106, five OR circuits 107, 108, 109, 110 and 111, a unidirectional buffer 112, a bidirectional buffer 113, a decoder 114 and a ROM 120.

The RAM's 103 through 106 are storage areas to store program data. Usually, the RAM's 103 and 104 store the program data for the CPU 101 and RAM's 105 and 106 store the program data for the CPU 102.

The decoder 114 decodes bank switching signal from the CPU 101 when program data is input so as to output the selection signal to specify one of the RAM's 103 to 106 as the area where the input program data is to be stored.

The ROM 120 stores a program for loading to control loading of the program data from outside. The unidirectional buffer 112 is a circuit to transfer the write/read control signal and the address signal from the CPU 101 to the write/read control signal port R/W and the address signal port ADD at the RAM 105 and the RAM 106 in the CPU 102. This transfer is controlled by the control signal output from the CPU 101 described later. The bidirectional buffer 113 transfers the program data input from outside to the CPU 101 to the RAM 105 and the RAM 106 in the CPU 102 and serves for mutual transfer of program data between the RAM 103 and the RAM 104 and the RAM 105 and the RAM 106 when required. This transfer is controlled by the selection signal from the decoder 114 with the transfer direction being controlled by the write/read control signal from the CPU 101.

A program data input terminal 115 for program data input from outside is connected to the data input port DATA IN at the CPU 101. The write/read control signal port R/W, the address signal port ADD and the data signal port DATA of the CPU 101 are connected with the corresponding write/read control signal port R/W, the address signal port ADD and the data signal port DATA of the RAM's 105 and 106 respectively. The data signal port DATA of the CPU 101 is further connected with the directional buffer 113. The write/read control signal port R/W of the CPU 101 is connected with the direction control input port DIR of the bidirectional buffer 113, the input port of the buffer 112 and the ROM 120. The address signal port ADD of the CPU 101 is connected with the input port of the buffer 112. The selection signal ports CS2 and CS1 corresponding to the RAM's 106 and 105 of the CPU 101 are connected with the OR circuits 110 and 111 and the output from the OR circuits 110 and 111 are connected with the selection signal port CS of the RAM's 105 and 106.

The output port SEL OUT to output the bank switching signal of the CPU 101 is connected with the input port SEL In of the decoder 114. The control signal output port CON OUT of the CPU 101 to output the control signal to specify that the program is being input is connected with the output control port of the buffer 112 and the control signal input port CON IN of the CPU 102.

The write/read control signal port R/W, the address signal port ADD and the data signal port DATA of the CPU 102 are connected with the corresponding write/read control signal port R/W, the address signal port ADD and the data signal port DATA of the RAM's 103 and 104 respectively. The data signal port DATA of the CPU 102 is further connected with the bidirectional buffer 113. The write/read control signal port R/W and the address signal port ADD of the CPU 102 are connected with the output port of the buffer 112. The selection signal ports CS1 and CS2 for the RAM's 103 and 104 of the CPU 102 are connected with the OR circuits 107 and 108 and the output from these OR circuits 107 and 108 are connected with the selection signal port CS of the RAM 103 and the RAM 104 respectively.

The selection signal ports CS1, CS2, CS3 and CS4 of the decoder 114 are connected with the input of the OR circuits 107, 108, 109, 110 and 111 respectively. The output from the OR circuit 109 is connected with the enable signal port EN to authorize the transfer by the bidirectional buffer 113.

Then, the processing for program change of the multiprocessor system configured as above according to the first embodiment is described.

The program data used by the CPU's 101 and 102 are sent to the CPU 101 via the program data input terminal 115. In normal status when program data from outside is not input, the CPU 101 and the CPU 102 operate according to the address maps as shown in FIGS. 2A and 2B.

The CPU 101 controls the program data input from outside using the program for loading stored in the ROM 120. When the program data from outside is input, the CPU 101 outputs the control signal to indicate that program data is being input from the control signal output port CON OUT, which is input to the control signal input port CON IN of the CPU 102. The input of this control signal causes the CPU 102 to cease the control over the RAM 103 and the RAM 104.

At this point, the bank switching signal from the output port SEL OUT of the CPU 101 is input to the input port SEL IN of the decoder 114 and the selection signal to specify one of the RAM's 103 to 106 is output from the selection signal ports CS1, CS2, CS3 and CS4 of the decoder 114. The selection signal from the selection signal ports CS1 or CS2 is output to the selection signal port CS of the RAM's 103 and 104 via the OR circuits 110 and 111. The selection signal from the selection signal port CS3 or CS4 is output to the selection signal port CS of the RAM's 105 and 106 via the OR circuits 107 and 108.

Provision of the control signal from the CPU 101 to the output control input port of the unidirectional buffer 112 enables input of the signals from the write/read control signal port R/W and the address signal port ADD of the CPU 101 to the write/read control signal port R/W and the address signal port ADD of the RAM 105 and the RAM 106 via the unidirectional buffer 112. Further, input of the selection signal from the selection signal ports CS3 and CS4 of the decoder 114 to the enable signal port EN of the bidirectional buffer 113 via the OR circuit 109 enables data communications via the bidirectional buffer 113 between the data signal port DATA of the CPU 101 and the data signal ports DATA of the RAM 105 and the RAM 106. The change of direction at the bidirectional buffer 113 is controlled by the signal from the write/read control signal port R/W of the CPU 101, which is input to the direction control input port DIR.

Thus, the RAM 105 and the RAM 106 are selected according to the selection signal from the selection signal ports CS3 and CS4 of the decoder 114, so that they can be controlled by the CPU 101. At the same time, the RAM 103 and the RAM 104 which serve for the CPU 101 itself can be controlled by the selection signal from the selection signal ports CS1 and CS2 of the decoder 114. The decoder 114 is controlled by the bank switching signal from the CPU 101.

Therefore, by specifying one of the RAM's 103 to 106 using the bank switching signal, RAM's 103, 104, 105 and 106 can be assigned to a certain address area in the CPU 101. FIG. 3 shows the address map for the CPU 101 under such situation. In FIG. 3, the address area of the RAM 104 in the CPU 101 is used as the bank switching area and the RAM's 103 to 106 are selectively assigned to the bank switching area.

By serially storing program data from outside to the RAM's 103 to 105 with bank switching using the decoder 114 under such situation, the program data in the RAM's 103 to 106 can be changed.

Upon completion of program data input, the control signal showing that the program data is being input at the CPU 101 is canceled. This enables control over the RAM's 105 and 106 of the CPU 102 and disables transfer by the unidirectional buffer 112. This causes the write/read signal and the address signal of the CPU 101 to be separated from the RAM's 105 and 106, resulting in the status shown by the address maps in FIGS. 2A and 2B. Once the control signal to show that the program data is being input is canceled, the CPU 102 can perform processing using the changed program stored in the RAM's 105 and 106. Thus the program data in a plurality of CPU's (101 and 102) can be changed using a simple procedure. Since the RAM's 103 to 106 of the CPU's 101 and 102 are selectively assigned to the bank switching area in this first embodiment, the program data can be serially stored to the RAM's 103 to 106 without any change in the address map of the CPU 101.

Figure 4:
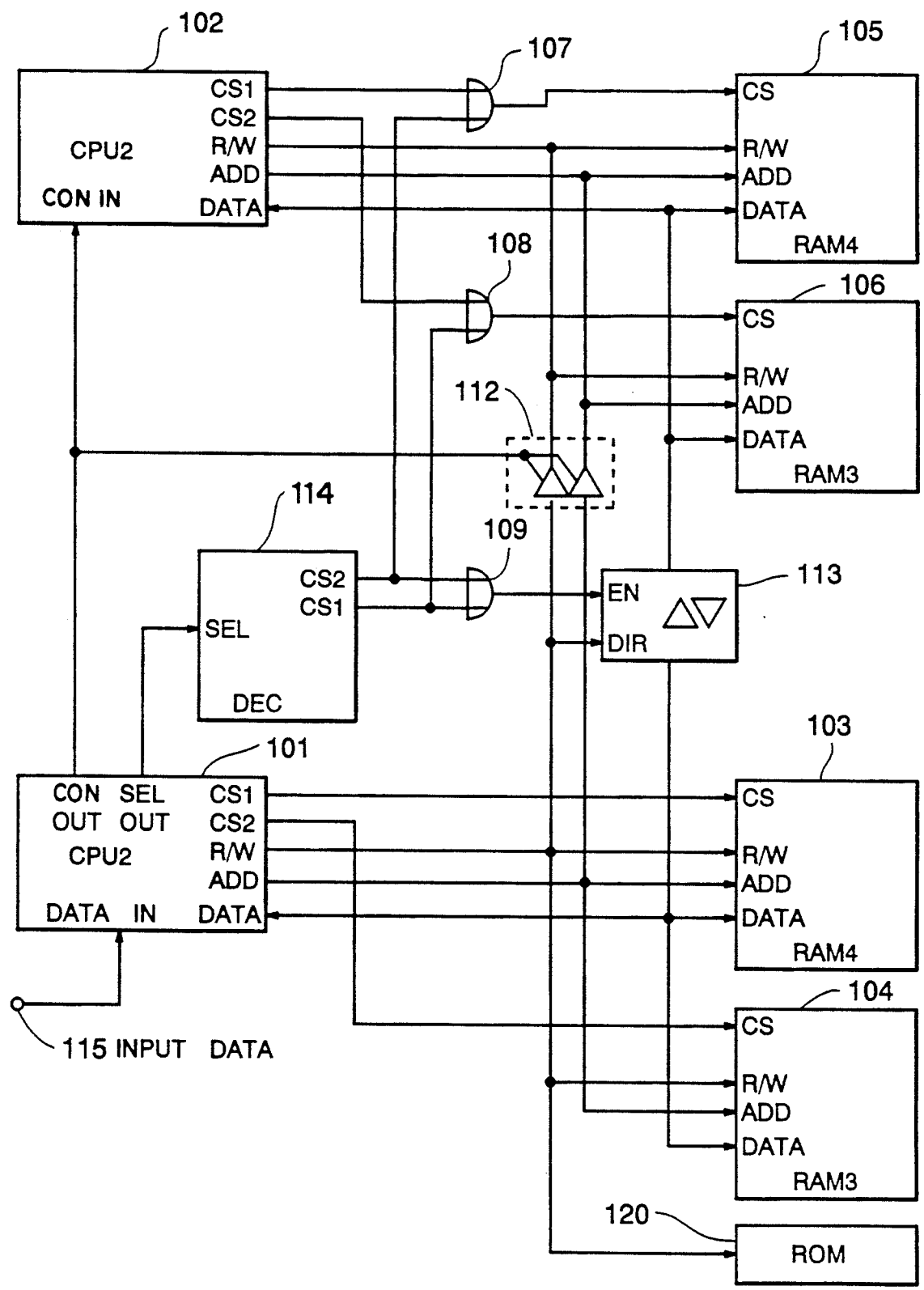
FIG. 4 is a block diagram to show the configuration of a multiprocessor system with program change function according to a second embodiment of the present invention.

Referring now to FIG. 4, a multiprocessor system where a program change method according to a second embodiment of the present invention is described now. FIG. 4 is a block diagram to show the configuration of the second embodiment.

In the second embodiment, a RAM 105 and a RAM 106 corresponding to a CPU 102 are controlled by a decoder 114. A RAM 103 and a RAM 104 are controlled by a CPU 101 as they are in the first embodiment. Consequently, the OR circuits 110 and 111 in FIG. 1 are omitted here. In addition, the decoder 114 is provided with selection signal ports CS1 and CS2 only, which are to be connected with the RAM 105 and the RAM 106. Except these points, the configuration of the second embodiment is the same as that in FIG. 1.

Then, the processing for program change of a multiprocessor system as configured as above according to the second embodiment is now described.

Figure 5A:
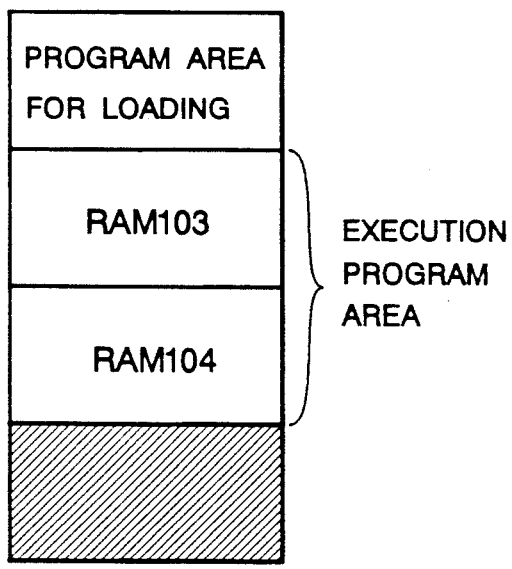
FIGS. 5A and 5B, is a diagram to show the address maps of the multiprocessor system according to the second embodiment in normal status.
Figure 5B:
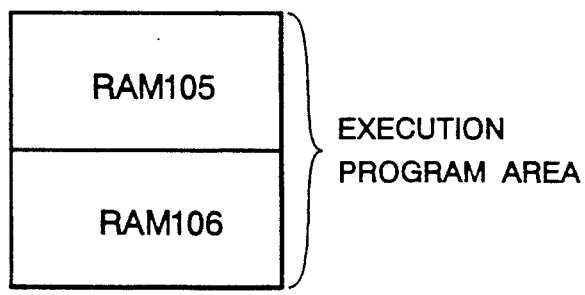

In normal status when any program data is not being input from outside, the CPU's 101 and 102 operate according to the address maps shown in FIGS. 5A and 5B. The address map of the CPU 101 in this embodiment is, unlike the one in FIG. 2A, provided with the bank switching area for assignment of RAM's 105 and 106 in advance.

The CPU 101 controls the program data input from outside using the program for loading stored in a ROM 120. When program data from outside is input, the CPU 101 outputs the control signal to indicate that the program data is being input from the control signal output port CON OUT. This signal is input to the control signal input port CON IN of the CPU 102. Input of the control signal cancels the control over the RAM's 105 and 106 by the CPU 102.

At this point, the bank switching signal from the output port SEL OUT of the CPU 101 is input to the input port SEL IN of the decoder 114, and selection signals are output from the selection signal ports CS1 and CS2 of the decoder 114. The selection signal from the selection signal port CS1 and CS2 are output to the selection signal port CS of the RAM 105 and the RAM 106 via the OR circuits 107 and 108. The control signal from the CPU 101 is provided to the output control input port of a unidirectional buffer 112, enabling input of the signal from the write/read control signal port R/W and the address signal port ADD of the CPU 101 to the write/read control signal port R/W and the address signal port ADD of the RAM 105 and the RAM 106 via the buffer 112. Besides, the selection signals from the selection signal ports CS1 and CS2 of the decoder 114 are input to the enable signal port EN of a bidirectional buffer 113 via an OR circuit 109, enabling data communications between the data signal port DATA of the CPU 101 and the data signal port DATA the RAM 105 and the RAM 106 via the bidirectional buffer 113. The change of direction at the bidirectional buffer 113 is controlled by the signal from the write/read control signal port R/W of the CPU 101, which is input to the direction control input port DIR.

Thus, the RAM's 105 and 106 are controlled by the selection signals from the selection signal ports CS1 and CS2 of the decoder 114, which enables control by the CPU 101. The RAM's 103 and 104 serving for the CPU 101 are controlled by the selection signal from the selection signal ports CS1 and CS2 of the CPU 101. The decoder 114 is controlled by the bank switching control signal from the CPU 101.

Figure 6:
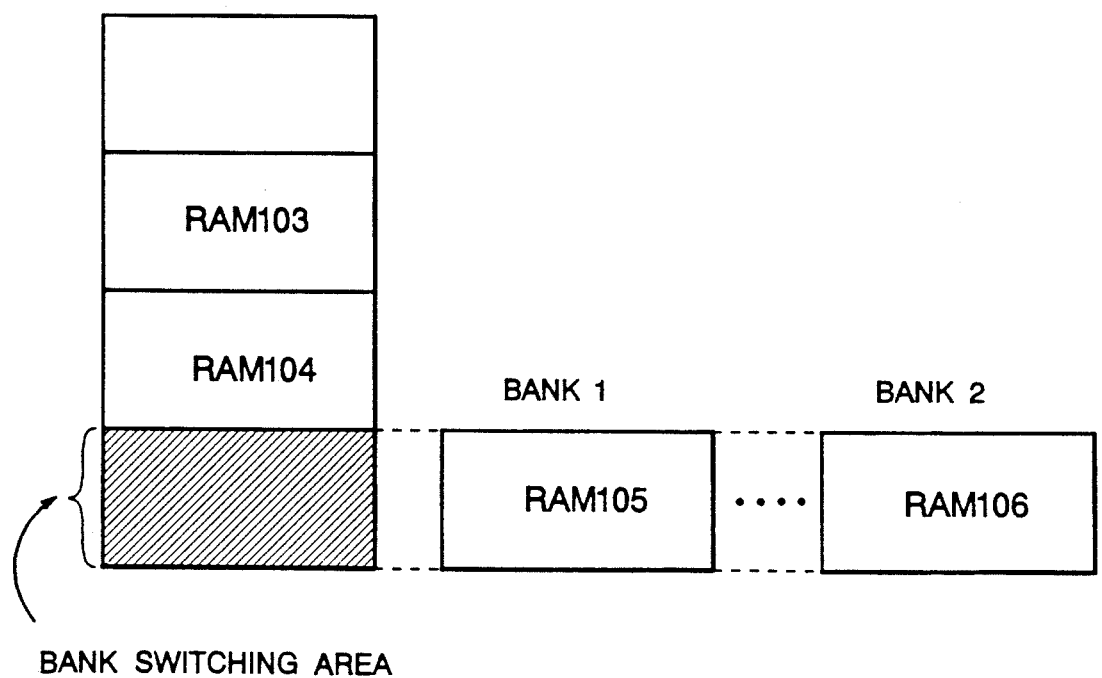
FIG. 6 is a diagram to show the address map of the multiprocessor system according to the second embodiment when program data is input.

Therefore, switching between the RAM 105 and the RAM 106 using the bank switching signal enables selective assignment of the RAM's 105 and 106 to the address of the bank switching area in the CPU 101 as shown in the address map shown in FIG. 5A. FIG. 6 shows the address map of the CPU 101 under such status. By sequentially storing the program data from outside to the RAM's 103 and 104 of the CPU 101 itself and to the RAM's 105 and 106 assigned to the bank switching area according to the selection by the decoder 114 under such status, the program data in the RAM's 103 to 106 are changed.

Upon completion of program data input, the control signal showing that the program data is being input at the CPU 101 is canceled. This causes separation from the CPU 102 and returns to the address maps shown in FIGS. 5A and 5B. Cancellation of the control signal showing that program data is being input enables the CPU 102 to perform processing using the changed program stored in the RAM's 105 and 106.

Obviously many modifications and variations of the present invention are possible. It is intended to cover in the appended claims all such modifications as fall within the true spirit and scope of the invention.

What is claimed is:

1. A multiprocessor system with program change function comprising:

a plurality of CPUs, including a particular CPU;

a plurality of storage means for storing program data to be executed by said CPU's, each of said storage means operating under control of a corresponding one of said CPUs during normal processing, said particular CPU including, input means for inputting program data from outside, first output means for outputting a control signal to others of said CPUs to cancel control over said storage means by said others of said CPUs during program data input, and second output means for outputting a switching signal identifying one of said plurality of storage means to store said program data;

selection means for selecting with a selection signal one of said plurality of storage means identified by said switching signal from said particular CPU;

transfer means responsive to said selection signal for selectively connecting data signals from said particular CPU to said storage means;

means responsive to said control signal for selectively connecting read/write and address signals from said particular CPU to said storage means; and gate means disposed between said selection means and said storage means for connecting said selection signal to said storage means selected by said particular CPU.

2. A multiprocessor system with program change function of claim 1 wherein said selection means comprises a decoder to decode said switching signal from said particular CPU and selectively output said selection signal for said plurality of storage means.

3. A multiprocessor system with program change function of claim 1 wherein said particular CPU assigns said selected storage means to the address area of its own storage means.

4. A multiprocessor system with program change function of claim 1 wherein said transfer means comprises a bidirectional buffer provided between said particular CPU and said other CPU storage means.

5. A multiprocessor system with program change function of claim 1 wherein an address area of said particular CPU is provided with an address area for assigning said storage means of other CPU selected by said selection means in addition to the address area of the storage means for the particular CPU itself.

6. A multiprocessor system comprising:

a plurality of CPUs including at least a first CPU and a second CPU;

a plurality of storage means for storing program data, each individual storage means being selectively connected to said first and second CPU, each of said storage means operating under control of a corresponding one of said plurality of CPUs during normal processing;

said first CPU being programmed to perform a program change function according to a single program change control program, means in said first CPU for providing a storage control signal in response to input of a program data to said first CPU, said storage control signal releasing said storage means from being under control of said second CPU during program data input state;

buffer means responsive to said storage control signal for selectively connecting read/write and address signals under control of said first CPU to said storage means;

means in said first CPU for providing a selection signal according to a control data contained in said program data input to said first CPU for storing said program data into an identified storage means; and means responsive to said selection signal for selectively connecting data signals from said first CPU to said storage means for loading said program data into said identified storage means.

7. A multiprocessor system comprising:

a first CPU receiving program data from an external source, said first CPU executing program load of said program data, said first CPU outputting a control out signal indicating a program load state and outputting a select signal to select a memory to load said program data;

a first memory receiving read/write, address and data signals under control of said first CPU under a non program load state condition;

at least one other CPU receiving said control out signal from said first CPU;

a second memory receiving read/write, address and data signals under control of said other CPU during said non program load state condition, said other CPU being responsive to said control out signal to stop outputting said read/write, address and data signals to said second memory;

buffer means responsive to said control out signal and said select signal for selectively connecting said read/write, address and data signals under control of said first CPU to said second memory;

a decoder connected to said first CPU to provide a first and second chip select signal to said first and second memories in response to said select signal provided from said first CPU; and wherein said control out signal and said select signal provided control by said first CPU over said read/write, address and data signals connected to said first and second memories, thereby allowing said first CPU to selectively perform program load into said first and second memories.

* * * * *